(12) United States Patent
Slavin et al.

(10) Patent No.: US 12,541,770 B2
(45) Date of Patent: Feb. 3, 2026

(54) SYSTEM AND METHOD FOR CLOUD-FIRST STREAMING AND MARKET DATA UTILITY

(71) Applicant: JPMorgan Chase Bank, N.A., New York, NY (US)

(72) Inventors: Ilya Slavin, Brooklyn, NY (US); Mathew Alistair Legge, Horley (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 215 days.

(21) Appl. No.: 17/643,488

(22) Filed: Dec. 9, 2021

(65) Prior Publication Data
US 2022/0188844 A1 Jun. 16, 2022

Related U.S. Application Data

(60) Provisional application No. 63/123,744, filed on Dec. 10, 2020.

(51) Int. Cl.
*G06Q 30/0201* (2023.01)

(52) U.S. Cl.
CPC ................. *G06Q 30/0201* (2013.01)

(58) Field of Classification Search
CPC .... G06Q 30/0201; G06Q 40/00; G06Q 30/02; G06F 9/46; G06F 17/60; G06F 17/246
USPC .......................................... 705/7.29, 37, 38
See application file for complete search history.

(56) References Cited

U.S. PATENT DOCUMENTS

| | | | |
|---|---|---|---|
| 7,831,503 B2 * | 11/2010 | Chiulli ................. | G06Q 40/04 705/37 |
| 8,036,929 B1 * | 10/2011 | Reisman ............ | G06Q 30/0203 705/7.29 |
| 9,372,735 B2 * | 6/2016 | Calder ................. | G06F 9/5077 |
| 10,324,948 B1 | 6/2019 | Leung et al. | |
| 10,963,635 B2 * | 3/2021 | Campbell ............. | G06F 3/0486 |
| 2008/0208820 A1 * | 8/2008 | Usey ..................... | G06F 16/313 |
| 2008/0265166 A1 * | 10/2008 | Shekhar ................ | G01T 1/1647 250/363.03 |

(Continued)

FOREIGN PATENT DOCUMENTS

| | | |
|---|---|---|
| JP | 2011-523240 A | 8/2011 |
| JP | 2019-096164 A | 6/2019 |

(Continued)

OTHER PUBLICATIONS

International Search Report (ISR) and Written Opinion (WO) from International Searching Authority (US) in International Pat. Appl. No. PCT/US2021/062585, dated Mar. 9, 2022.

(Continued)

*Primary Examiner* — Rutao Wu
*Assistant Examiner* — Stephen S Swartz
(74) *Attorney, Agent, or Firm* — GREENBLUM & BERNSTEIN, P.L.C.

(57) ABSTRACT

An embodiment of the present invention is directed to a full re-write of an entire data stack in a cloud-native manner. With an embodiment of the present invention, a reference data store that may be merged with a subsystem that normalizes inbound streaming data sets from in-cloud sources to feed a Global Elastic Grid Bus. The Global Elastic Grid Bus may be responsible for caching and distributing the information globally, as well as maintaining a single namespace accessible to some or all customers.

20 Claims, 2 Drawing Sheets

(56) References Cited

U.S. PATENT DOCUMENTS

| | | | |
|---|---|---|---|
| 2009/0037514 A1* | 2/2009 | Lankford | H04L 67/1001 709/201 |
| 2014/0019329 A1* | 1/2014 | Newell | G06Q 40/00 705/37 |
| 2014/0040182 A1* | 2/2014 | Gilder | G06F 16/256 707/602 |
| 2015/0347542 A1 | 12/2015 | Sullivan et al. | |
| 2016/0307207 A1* | 10/2016 | Busch | G06Q 30/0201 |
| 2017/0041296 A1* | 2/2017 | Ford | G06F 21/64 |
| 2018/0167476 A1* | 6/2018 | Hoffner | H04L 67/55 |
| 2018/0284736 A1 | 10/2018 | Cella et al. | |
| 2018/0336027 A1 | 11/2018 | Narayanan et al. | |
| 2019/0087900 A1 | 3/2019 | Crowley et al. | |
| 2020/0137097 A1* | 4/2020 | Zimmermann | H04L 63/1425 |
| 2020/0235990 A1* | 7/2020 | Janakiraman | H04L 41/0893 |
| 2022/0030152 A1* | 1/2022 | Guérin | G06T 5/002 |

FOREIGN PATENT DOCUMENTS

| | | |
|---|---|---|
| JP | 2020-504867 A | 2/2020 |
| WO | WO 2018/0112023 A1 | 6/2018 |
| WO | 2020/209865 A1 | 10/2020 |

OTHER PUBLICATIONS

European Search Report (ERS) from the European Patent Office (EPO) in European Pat. Appl. No. 21904392 / PCT/US2021/062585, dated Jan. 8, 2024.

Decision of Grant issued in the corresponding Japanese Patent Application No. 2022-564849 dated Nov. 4, 2025, brief translation.

\* cited by examiner

SYSTEM AND METHOD FOR CLOUD-FIRST STREAMING AND MARKET DATA UTILITY

CROSS REFERENCE TO RELATED APPLICATIONS

The application claims priority to U.S. Provisional Application 63/123,744, filed Dec. 10, 2020, the contents of which are incorporated herein in their entirety.

FIELD OF THE INVENTION

The invention relates generally to a system and method for providing a cloud-first streaming and market data utility.

BACKGROUND OF THE INVENTION

Financial institutions are large consumers of market data, which streams from over 600 data providers at speeds in excess of 1.5 mm updates per second in each region. Financial institutions also produce a lot of streaming content, both for internal and external distribution, roughly 1 mm updates per second in each region. This results in a bifurcated data distribution strategy involving information from various external sources outside an entity's firewall and may involve exchange data, broker data, vendor data, etc. Internal data is generated within the firewall and may represent pricing information and research or market data bound for external participants. Current technologies are linked to specific hardware, oftentimes proprietary, or require direct access to physical resources.

With current systems, there are modernization complexities. For example, modernization targets that need to be met to enter new data centers are particularly difficult to meet. Market data platforms transport, integrate and manage financial data from stock exchanges and other sources, typically in a very specific cadence. Each data stream starts with a full data "image" that is followed by a series of sequential updates. A single data feed may include thousands to hundreds of thousands of these data streams. To process such unique data loads, current market data platforms have a series of minimal requirements that are not met at present by modern elastic architectures. At the same time, large institutions presently do not wish to allow physical appliances or dedicated server hardware into new data centers. For example, such entities would require hundreds and hundreds of virtual machines to remove physical appliances thereby making modernization of internal data platforms (IDP) very costly and time intensive.

These and other drawbacks exist.

SUMMARY OF THE INVENTION

According to one embodiment, the invention relates to a system that implements a cloud-based market data utility. The system comprises: an input that receives reference data within a virtual private cloud; a data ingress normalizer that receives the reference data from the input and inbound streaming data sets from a plurality of partner virtual private cloud sources that correspond to external sources of market data; a global elastic grid bus that receives normalized data from the data ingress normalizer and the reference data and then distributes the normalized data while maintaining a single namespace and elastically adjusting one or more presentation views; a streaming interface that communicates with on-premises full-tick applications; and a snapping interface that communicates with on-premises snapping applications and cloud native applications.

According to another embodiment, the invention relates to a method that implements a cloud-based market data utility. The method comprises the steps of: receiving, via an input, reference data within a virtual private cloud; receiving, via a data ingress normalizer, the reference data from the input and inbound streaming data sets from a plurality of partner virtual private cloud sources that correspond to external sources of market data; receiving, via a global elastic grid bus, normalized data from the data ingress normalizer and the reference data and then distributing the normalized data while maintaining a single namespace and elastically adjusting one or more presentation views; communicating, via a streaming interface, with on-premises full-tick applications; and communicating, via a snapping interface, with on-premises snapping applications and cloud native applications.

The system and method may utilize a specially programmed computer system comprising one or more computer processors, interactive interfaces, electronic storage devices, and networks. The computer implemented system, method and medium described herein provide unique benefits and advantages to entities, organizations and other users, according to various embodiments of the invention. An embodiment of the present invention supports a modern, cloud-first architecture that embraces natural elasticity as well as presence of a plurality of information providers in cloud infrastructures. An embodiment of the present invention provides an elastic scalability model. Significant reductions in costs and efficiencies in resources and time may be realized. This may include an opportunity to realize reduction of spend on software licenses for current technologies.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
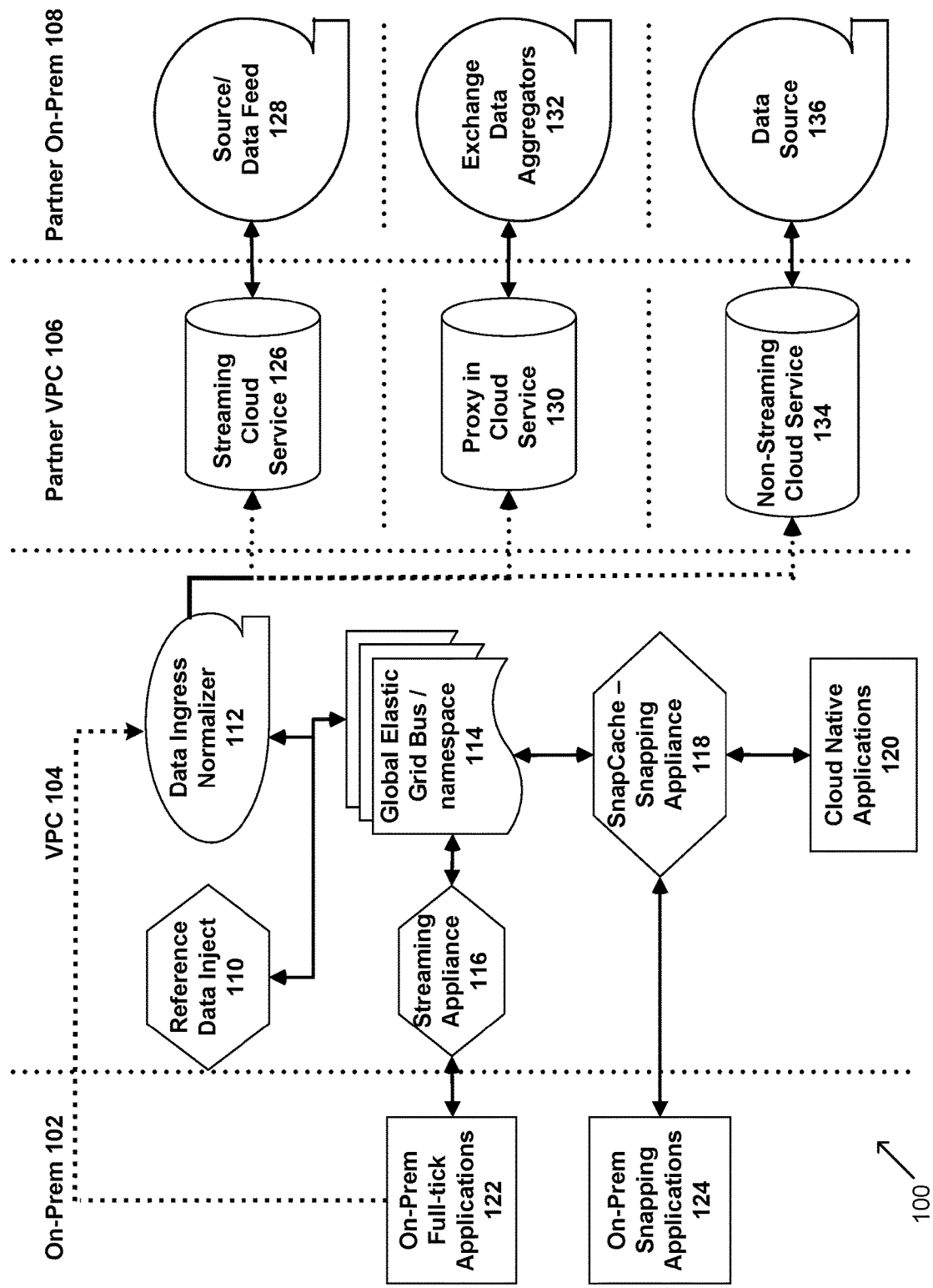
FIG. 1 is an exemplary system diagram, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a full re-write of an entire data stack in a cloud-native manner. With an embodiment of the present invention, a reference data store may be merged with a subsystem that normalizes inbound streaming data sets from in-cloud sources to feed a Global Elastic Grid Bus. The Global Elastic Grid Bus may be responsible for caching and distributing the information globally, as well as maintaining a single namespace accessible to customers. In order to retrieve data, a snapping appliance (in the form of SnapCache, for example) and a streaming appliance may be provided. In either case, the user may define how it prefers to see the information, in terms of symbology, specific vendor format and/or other preferences. The Global Elastic Grid Bus may provide the information to any appliance in the form appropriate to the user's data selection.

Because the content is virtualized, different data sources may contribute to the delivery of the presentation to the users. This may permit administrative selection of a best source for each field, rather than having users pre-select a specific vendor and further bind themselves to their content. Additionally, market data does not follow load patterns that cloud providers are accustomed to (e.g., 5 minutes to spin up additional elastic instances), and may be designed from the start to have necessary capacity to absorb market micro-spikes, which may have a sub-second duration. Operating costs are expected to be substantially lower because much of the environment in each region may be turned down outside that region's market hours. Additional savings based on vendor licenses and higher negotiating leverage may be realized.

An embodiment of the present invention is directed to implementing modern architecture and elastic technology to displace legacy expensive vendor-centric technologies. According to an embodiment of the present invention, a cloud-native Global Elastic Grid Bus may virtualize distribution and access to information. Driven by reference data, the Global Elastic Grid Bus may merge data from different providers and/or sources into a single security view and then allow end-users to define how they want to see the data to support backward compatibility to legacy sources.

An embodiment of the present invention is directed to elastically adjusting presentation views so that various users and clients may view data in a particular and specific way. This may be irrespective of the source of data so that the presentation view may be based on various data feeds, data providers as well as other considerations. For example, an entity may have written hundreds of applications using a particular data model. With an embodiment of the present invention, those applications may now receive data from a different data provider of data feeds without any perceived change by the entity's customers. This provides flexibility and facilitates integration with different data providers as needed or desired.

An embodiment of the present invention may connect to business partners via a cloud platform link that provides private connectivity between virtual private clouds (VPCs) and services hosted on a cloud platform or on-premises. In addition, a cloud platform link may ensure that traffic is not exposed to public networks. The cloud platform link may eliminate transit through an entity's network or servers. This may be particularly relevant for entities that communicate sensitive financial and/or personal data, such as a bank or financial institution. An embodiment of the present invention may further elastically re-size the environment off-hours to decrease runtime cost and further support various interfaces, such as snapping and streaming interfaces.

A cloud platform link may provide the ability to connect cloud containers to external parties. This enables systems to make a virtual hop from an internal network to other networks all within the cloud. An embodiment of the present invention supports elastically resizing an environment. In addition, an embodiment of the present invention provides the ability to fan-out information within the clouds.

An embodiment of the present invention is directed to developing a Bucketing Aggregator. While cloud platforms host many products with large user bases, they have limited experience with workloads that are both "spiky" in volume and intolerant of data loss. Certain technologies, such as private connectivity services, have hidden settings that may pre-scale above a certain baseline while others are simply not appropriate. An entity's controls may be accomplished via "hidden" VPCs that have not been tested at a scale that market data requires.

In addition, the Bucketing Aggregator may allow customers to identify securities and provide a corresponding request. The request may include data relating to ticks for a set of fields within a time frame, e.g., every tick for 30 seconds. An embodiment of the present invention may create a virtual mailbox (or other storage component) and communicate to the customer when the request has been addressed. For example, an output may include a block with an aggregate set of data that was requested. This may essentially simulate receiving a stream of events. Other client notification methods and client-initiated "pull" methodologies may be supported.

With the Bucketing Aggregator of an embodiment of the present invention, a use case may be realized between real-time reactive algorithms. This may involve collecting point-in-time snapshots which include a need to collect all data points within a short window of time from a set of topics. Examples may include tick capture warehouses, clients that need to view and access trade messages, hedging algorithms, etc. Truly reactive streaming applications have low network latency requirements that may not be satisfied by traditional Public Cloud services, but may evolve in the future as cloud products and technology expand into low latency electronic trading. An embodiment of the present invention may be directed to a modernized managed service that listens to a data stream and allows snapshot-style retrievals of all ticks that match predefined criteria. Additional value-add through analytical functions may be realized.

An embodiment of the present invention is directed to developing an Elastic Grid Bus that maintains a single namespace while preserving regional locality of data. This may include transparently scaling to 6-10 million topics worldwide and 3-4 million external updates per second per region, or beyond. An embodiment of the present invention further recovers from failures and responds to local volume spikes, capable of down- and up-scaling based on signals. Other features may include: streaming API via OpenMAMA; interfacing with an external content providers and abstracting content access for symbology, fields and data types.

FIG. 1 is an exemplary system diagram, according to an embodiment of the present invention. An embodiment of the present invention implements a unique and innovative design that provides a cloud first offering. With this design, a snapping appliance (e.g., SnapCache) may be moved in its entirety to a cloud platform. Data components (e.g., enterprise platforms, internal data platforms, etc.) may be replaced by a new data bus. Exchange data aggregators may be connected via a cloud platform link. Inbound data streams may be merged to allow displacement of incumbent data sources. Other considerations may include agreements with data vendors and exchanges to consume data in-cloud; needing to migrate legacy vendor API users and implementing different operational frameworks. An embodiment of the present invention may realize elastic scaling; provide an ability to offer traditional feeds and direct aggregated data and further reduce vendor spend by splicing content from different vendors.

The system illustrated in FIG. 1 may include On-Premise 102, Virtual Private Cloud (VPC) 104, Partner VPC 106 and Partner On-Premise 108. As shown in FIG. 1, Partner On-Premise 108 entities have externalized their technologies in various virtual containers on cloud services, as shown by Partner VPC 106.

An embodiment of the present invention may include a combination of unique components including Reference Data Inject 110, Data Ingress Normalizer 112, Global Elastic Grid Bus/Namespace 114, Stream Appliance 116 and Snapping Appliance 118. On-Premise full tick applications 122 may communicate via Stream Appliance 116. A tick represents a change in data and may represent a measure of upward or downward movement in a price of a security. More volatile securities will have a faster rate of change. For example, some risk management systems may need to see every trade that happens in the market. On-Premise Snapping Applications 124 may communicate with Snapping Appliance 118 which may also communicate with Cloud Native Applications 120.

Other applications may be supported including a streaming interface that provides conflated data. This provides an update for a certain amount of time that may be configurable or predefined. Streaming with conflated data may provide streaming updates but not for every tick.

Internal data may include data that is generated within an entity's firewalls or virtual private clouds (VPCs) and may include pricing information, research data, market data, etc. Internal data may also include signaling between two different applications or different application components. For example, streaming information may have the semantics of market data that is generated internally. Such systems are routinely moving data around between components, internally and/or externally.

Data Ingress Normalizer 112 may receive inputs from Reference Data Inject 110. The normalized output may be received by Global Elastic Data Grid Bus/Namespace 114. According to an embodiment of the present invention, Global Elastic Grid Bus/Namespace 114 may grow and shrink as needed. For example, if a portion of the Grid fails, an embodiment of the present invention may continue to function without affecting a customer's ability to see or access data with minimal or no data loss. A self-help declaration feature may be implemented that provides alerts and/or notifications when certain conditions are met, such as when capacity is reaching a threshold. This may be performed transparently to end users within a single namespace.

With a single namespace, an embodiment of the present invention may call functions/actions in a manner where the infrastructure hides physical distribution of data from the clients and then distributes data while making the necessary connections as needed. This global name space may create "data gravity" to keep certain locally-generated topics as close to the users as possible, while fetching them on demand for subscribers around the world. With Global Elastic Grid Bus/Namespace 114, an embodiment of the present invention may support various interfaces, e.g., Stream Appliance 116, Snapping Appliance 118, etc. Additional applications may then connect to the interfaces including on-premises or cloud native. According to an exemplary illustration, Snapping Application 118 may support real-time databases, such as SnapCache.

An embodiment of the present invention supports various interfaces, including streaming and snapping interfaces. For example, a hedging system may need to adjust its strategy based on trends in the market. A streaming interface may provide access to real-time or near real-time data relating to data points that are required to make hedging decisions. Another example of a streaming interface may involve a tick capture system. In this example, a historical data warehouse may need to accumulate all transitions within the price of a security. This information may be provided to electronic trading algorithms that analyze historical data and determine times and values of each transition. The streaming interface may be implemented for back testing reference data to prove an algorithm generated the right answer each time.

In terms of snapping a message, a client may want to price a portfolio of securities. Accordingly, there is a need to determine the price of the set of securities at the moment in time.

External services may include various cloud services, represented by 126, 130 and 134, which may be hosted, respectively, by third party and partner systems, represented by 128, 132 and 136, or by third party business partners acting on behalf of data providers. Information from external sources may include exchange data, broker data, vendor data, etc.

Exchange data aggregators may receive streaming data from various providers and sources and then provide a consolidated feed of streaming data.

Providers and sources may represent streaming providers as well as non-streaming data providers.

Streaming Cloud Service 126 may represent a market data feed that enables global connectivity to consolidated, normalized market data in real-time. This market data feed may represent a managed service providing programmatic access to a catalog of content. This consolidated market data feed provides comprehensive real-time data access available, along with streaming delayed data. It may be fed by hundreds of real-time exchanges and thousands of unique contributed sources. In addition, the market data feed may deliver data to support a wide range of third party applications.

In addition, Streaming Cloud Service 126 may represent a data platform that delivers real-time data to server based applications in both the cloud and customer sites. A full range of real-time data may be delivered via APIs in the cloud. This provides consolidated access to real-time content. This data platform provides access to global, real-time exchange, over the counter (OTC) and contributed data.

An embodiment of the present invention is directed to a scalable and elastic solution that effectively runs on cloud-based scenarios. In addition, an embodiment of the present invention is further directed to making the content elastic as well. A piece of data that comes from a data broker will have certain characteristics, e.g., name, set of fields, types of values, etc. Even if an API is abstracted for access to a system that distributes information, the client application is still highly bound to the source of that information because it is coded to the symbology of the third party partner (source). Accordingly, there is an expectation for certain values in certain fields. An embodiment of the present invention is directed to using reference data to create a dynamic abstraction of the presentation to the customer, both for symbology and field-value pairs. For example, various data providers may refer to the same financial product by different names, identifiers, etc. Different terms may be used to identify the same piece of information. An embodiment of the present invention may apply a mapping feature that maps the names of the fields and corresponding values between different providers and sources of data. This would allow an operator of such system to swap data content providers in order to increase competition and improve negotiating leverage.

An embodiment of the present invention seeks to realize various efficiencies including elastic scaling and less dependency on third party products and services. An embodiment of the present invention may apply to various streaming data applications. For example, the various embodiments of the present invention may apply to financial industries as well as other industries, such as factory automation which may involve telemetry from various parts of an assembly line. This may involve automating analytics introspection, quality assurance, quality control, etc. An embodiment of the present invention provides elastic data distribution in various environments, scenarios and applications.

Figure 2:
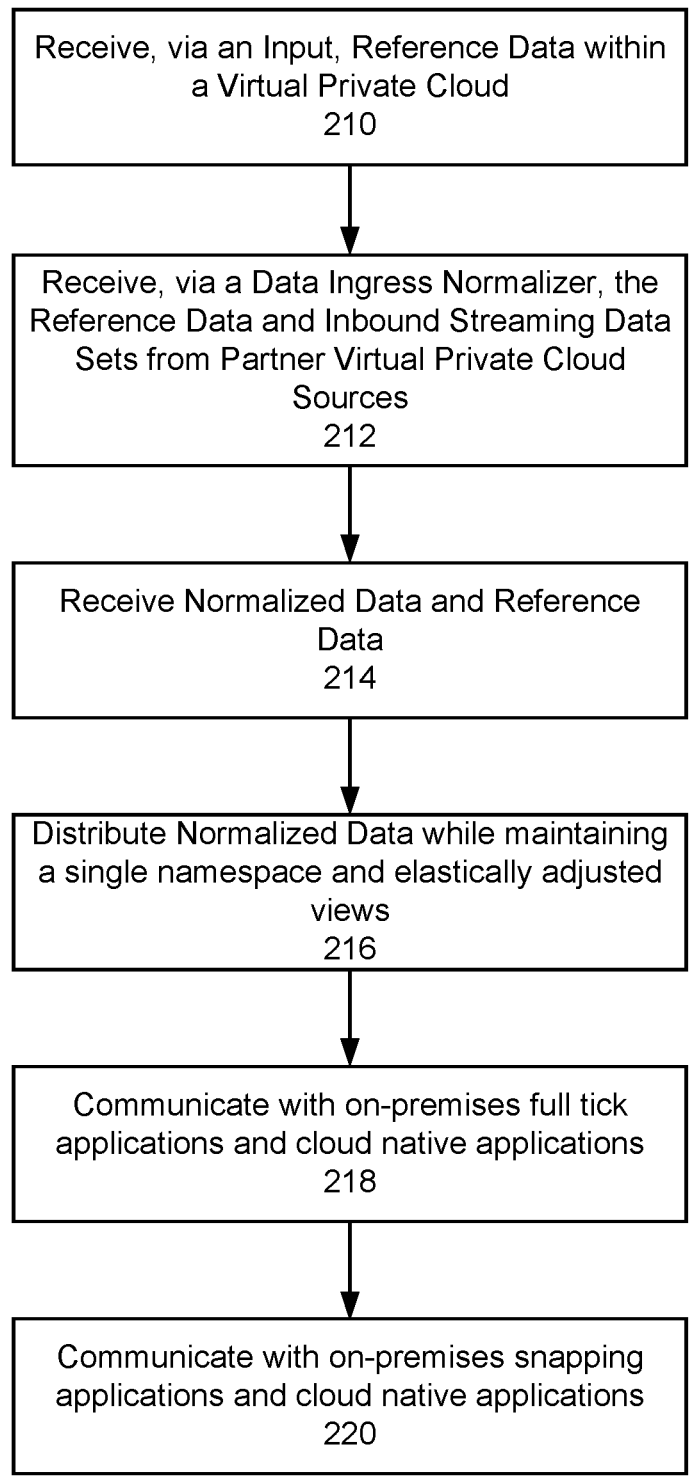
FIG. 2 is an exemplary flowchart, according to an embodiment of the present invention.

FIG. 2 is an exemplary flowchart, according to an embodiment of the present invention. At step 210, an input may receive reference data within a virtual private cloud. At step 212, a data ingress normalizer may receive the reference data from the input and inbound streaming data sets from a plurality of partner virtual private cloud sources that correspond to external sources of market data. At step 214, a global elastic grid bus receives normalized data from the data ingress normalizer and the reference data. At step 216, the normalized data is distributed while maintaining a single namespace and elastically adjusting presentation views. At step 218, a streaming interface communicates with on-premises full-tick applications and cloud native applications. At step 220, a snapping interface communicates with on-premises snapping applications and cloud native applications. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

An embodiment of the present invention may be supported by an entity, such as a financial institution, organization, etc. Users may interact via various communication networks. Users may represent users in the financial environment as well as other users that rely on real-time data.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 are depicted, it should be appreciated that other connections and relationships are possible. The system 100 described below may be used to implement the various methods herein, by way of example. Various elements of the system 100 may be referenced in explaining the exemplary methods described herein.

Communication networks may include a wireless network, a wired network or any combination of wireless network and wired network. For example, communication networks may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, communication networks may support an Internet network, a wireless communication network, a cellular network, Bluetooth, or the like, or any combination thereof. Communication networks may further include one, or any number of the exemplary types of networks mentioned above operating as a stand-alone network or in cooperation with each other. Communication networks may utilize one or more protocols of one or more network elements to which it is communicatively coupled. Communication networks may translate to or from other protocols to one or more protocols of network devices. Communication networks may comprise a plurality of interconnected networks, such as, for example, a service provider network, the Internet, a cellular network, corporate networks, or even home networks, or any of the types of networks mentioned above.

Data may be transmitted and received via communication networks utilizing a standard networking protocol or a standard telecommunications protocol. For example, data may be transmitted using Session Initiation Protocol ("SIP"), Wireless Application Protocol ("WAP"), Multimedia Messaging Service ("MIMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

While FIG. 1 illustrates individual devices or components, it should be appreciated that there may be several of such devices to carry out the various exemplary embodiments. Users may communicate with various entities using any mobile or computing device, such as a laptop computer, a personal digital assistant, a smartphone, a smartwatch, smart glasses, other wearables or other computing devices capable of sending or receiving network signals.

The system of FIG. 1 may be communicatively coupled to various storage devices, such as databases. Databases may include any suitable data structure to maintain the information and allow access and retrieval of the information. For example, databases may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

An embodiment of the present invention may support various user interfaces. User interface may provide various types of functions including informative, analytics, etc. For example, a user may want to know how a portfolio is performing. From an analytics perspective, a user may access an aggregate perspective portfolio. Other users may include producers of information. For example, traders may make markets, make trades, etc. To perform such actions, an embodiment of the present invention may provide real-time spot prices so that the value is ascertained at the moment of execution. The types of user interfaces may be specific to the speed of the interaction. Various interfaces may be supported and designed for specific types of interactions in specific markets.

An embodiment of the present invention is directed to elastically adjusting presentation views. This may apply to views displaying state of portfolios where the numbers, icons and other indicators may adapt and change for individual stocks, for example. Other graphical interfaces may be adjusted in real-time for different assets within a portfolio and across portfolios. Other interfaces may calculates an aggregate result of a number of data points based on a formula or algorithm. Various sources of data may be accessed and integrated.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a cloud-based market data utility, the system comprising:
   a cloud platform link that is configured to eliminate transit through an internal network, to ensure that traffic is isolated from public networks, and is further configured to provide private connectivity to a plurality of partner virtual private cloud sources that correspond to external sources of market data that comprises at least one market micro-spike;
   an input configured to receive, via the cloud platform link, reference data from the plurality of partner virtual private cloud sources;
   a data ingress normalizer configured to absorb micro-spikes in volume, that have a duration that amounts to less than one second of time, wherein the data ingress normalizer receives the reference data from the input and inbound streaming data sets of a best partner virtual private cloud source selected from among the plurality of partner virtual private cloud sources;
   a scalable global elastic grid bus that grows and shrinks and that:
      receives the reference data and normalized data from the data normalizer;
      caches the reference data and the normalized data;
      globally distributes the reference data and the normalized data while maintaining a single namespace and elastically adjusting one or more presentation views according to at least one user preference; and
      preserve data regional locality by transparently scaling topics; a streaming interface that communicates with at least one on-premises full-tick application that allows snapshot-style retrieval of all ticks that match a predefined criteria; and
   a snapping interface that communicates with on-premises snapping applications and cloud native applications,
   wherein the scalable global elastic grid bus is configured to communicate with an additional streaming interface that provides conflated data that comprises at least one streaming update,
   wherein the reference data and additional streaming market data are used to generate a view of information to one or more downstream consumers; and
   wherein the global elastic grid bus responds to a failure of at least a portion of the global elastic grid bus by at least one from among growing and shrinking, such that operations continue transparently to the end user with minimal or no data loss.

2. The system of claim 1, wherein the view of information comprises at least one from among symbology data and a specific vendor format.

3. The system of claim 1, wherein the streaming interface further communicates with cloud native applications.

4. The system of claim 1, wherein the plurality of partner virtual private cloud sources comprise at least one proxy in cloud service.

5. The system of claim 1, wherein the external sources of market data comprise exchange data aggregators.

6. The system of claim 1, wherein the on-premises snapping applications communicates with one or more real-time databases.

7. The system of claim 1, wherein the one or more presentation views are transmitted via a user interface with real-time data.

8. A method that implements a cloud-based market data utility, the method comprising:
   connecting, via a cloud platform link that eliminates transit though an internal network and provides private connectivity, to a plurality of partner virtual private cloud sources that correspond to external sources of market data that comprises at least one market micro-spike;
   receiving, from an input via the cloud platform link, reference data from the plurality of partner virtual private cloud sources;
   receiving, via a data ingress normalizer, the reference data from the input and inbound streaming data sets of a best partner virtual private cloud source selected from among the plurality of partner virtual private cloud sources, wherein the data ingress normalizer is configured to absorb micro-spikes in volume that have a duration that amounts to less than one second of time;
   receiving, via a global elastic grid bus, the reference data and normalized data from the data ingress normalizer;
   caching, via the global elastic grid bus, the reference data and the normalized data;
   globally distributing, via the global elastic grid bus, the reference data and the normalized data while maintaining a single namespace and elastically adjusting one or more presentation views according to at least one user preference;
   preserving data regional locality by transparently scaling topics;
   communicating, via a streaming interface, with at least one on-premises full-tick application that allows snapshot-style retrieval of all ticks that match a predefined criteria;
   communicating, via a snapping interface, with on-premises snapping applications and cloud native applications; and
   communicating, via the global elastic grid bus, with an additional streaming interface that provides conflated data that comprises at least one streaming update, and
   wherein the reference data and additional streaming market data are used to generate a view of information to one or more downstream consumers; and
   wherein the global elastic grid bus responds to a failure of at least a portion of the global elastic grid bus by at least one from among growing and shrinking, such that operations continue transparently to the end user with minimal or no data loss.

9. The method of claim 8, wherein the view of information comprises at least one from among symbology data and a specific vendor format.

10. The method of claim 8, wherein the streaming interface further communicates with cloud native applications.

11. The method of claim 8, wherein the plurality of partner virtual private cloud sources comprise at least one proxy in cloud service.

12. The method of claim 8, wherein the external sources of market data comprise exchange data aggregators.

13. The method of claim 8, wherein the on-premises snapping applications communicates with one or more real-time databases.

14. The method of claim 8, wherein the one or more presentation views are transmitted via a user interface with real-time data.

15. The system of claim 1, wherein the cloud-based market data utility responds to a first market micro-spike by determining, based on the first market micro-spike, to perform at least one from among upscaling and downscaling.

16. The method of claim 8, wherein the cloud-based market data utility responds to a first market micro-spike by determining, based on the first market micro-spike, to perform at least one from among upscaling and downscaling.

17. The system of claim 1, wherein the cloud platform link is further configured to enable, by connecting cloud containers to external parties, a virtual hop from the internal network to a cloud platform.

18. The method of claim 8, further comprising:
    enabling, by utilizing the cloud platform link to connect cloud containers to external parties, a virtual hop from the internal network to a cloud platform.

19. The system of claim 1, wherein the single namespace responds to a failure of at least a portion of the global elastic grid bus, by at least one from among growing and shrinking.

20. The method of claim 8, wherein the single namespace responds to a failure of at least a portion of the global elastic grid bus, by at least one from among growing and shrinking.

* * * * *